United States Patent
Nishio et al.

(10) Patent No.: US 12,308,383 B2
(45) Date of Patent: May 20, 2025

(54) SOLID ELECTROLYTE MATERIAL AND BATTERY USING SAME

(71) Applicant: Panasonic Intellectual Property Management Co., Ltd., Osaka (JP)

(72) Inventors: Yusuke Nishio, Osaka (JP); Kazufumi Miyatake, Osaka (JP); Takashi Kubo, Hyogo (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 708 days.

(21) Appl. No.: 17/548,682

(22) Filed: Dec. 13, 2021

(65) Prior Publication Data

US 2022/0102754 A1    Mar. 31, 2022

Related U.S. Application Data

(63) Continuation of application No. PCT/JP2020/009174, filed on Mar. 4, 2020.

(30) Foreign Application Priority Data

Jul. 4, 2019  (JP) ................. 2019-125563

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01)

(58) Field of Classification Search
CPC ......... H01M 10/0562; H01M 10/0525; H01M 2300/008
See application file for complete search history.

(56) References Cited

U.S. PATENT DOCUMENTS

| | | | |
|---|---|---|---|
| 2012/0301796 A1 | 11/2012 | Ohtomo et al. | |
| 2019/0088995 A1* | 3/2019 | Asano | H01M 10/052 |
| 2019/0245240 A1 | 8/2019 | Park et al. | |
| 2019/0273258 A1* | 9/2019 | Thomas-Alyea | H01M 10/0585 |
| 2020/0328457 A1 | 10/2020 | Sakai et al. | |
| 2021/0296693 A1 | 9/2021 | Nishio et al. | |

FOREIGN PATENT DOCUMENTS

| | | | |
|---|---|---|---|
| CN | 109075390 A | | 12/2018 |
| CN | 109950617 A | * | 6/2019 |
| CN | 111492443 A | | 8/2020 |
| CN | 112930319 A | | 6/2021 |
| EP | 3736828 A1 | | 11/2020 |

(Continued)

OTHER PUBLICATIONS

English Machine Translation for CN-109950617-A (Year: 2019).*

(Continued)

*Primary Examiner* — Matthew W Van Oudenaren
*Assistant Examiner* — Katherine N Higgins
(74) *Attorney, Agent, or Firm* — GREENBLUM & BERNSTEIN, P.L.C.

(57) ABSTRACT

A solid-electrolyte material includes Li, Y, O, and X. X is at least two elements selected from the group consisting of F, Cl, Br, and I. O is present in a surface region of the solid-electrolyte material.

10 Claims, 4 Drawing Sheets

(56) References Cited

FOREIGN PATENT DOCUMENTS

| | | |
|---|---|---|
| EP | 3736897 A1 | 11/2020 |
| EP | 3904278 A1 | 11/2021 |
| JP | 2011-129312 | 6/2011 |
| JP | 2013073791 A * | 4/2013 |
| JP | 2019-513687 | 5/2019 |
| WO | 2018/025582 | 2/2018 |
| WO | WO-2018025582 A1 * | 2/2018 .......... C01F 17/0031 |
| WO | 2018/062770 A1 | 4/2018 |

OTHER PUBLICATIONS

English Machine Translation for JP 2013073791 A (Year: 2013).*
English Machine Translation for WO-2018025582-A1 (Year: 2018).*
International Search Report of PCT application No. PCT/JP2020/009174 dated Apr. 21, 2020.
The Indian OA dated Jul. 13, 2023 for the related Indian Patent Application No. 202147059352.
English Translation of Chinese Search Report dated Jan. 24, 2024 for the related Chinese Patent Application No. 202080037204.6.
English Translation of Chinese Search Report dated Jul. 28, 2023 for the related Chinese Patent Application No. 202080037204.6.
Y.Tomita et al. "Substitution effect of ionic conductivity in lithium ion conductor", «Solid State Ionics» vol. 179, issue 21-26, pp. 867-870 (2008).
Extended European Search Report dated Jul. 29, 2022 for the European Patent Application No. 20835045.4.

* cited by examiner

SOLID ELECTROLYTE MATERIAL AND BATTERY USING SAME

BACKGROUND

1. Technical Field

The present disclosure relates to a solid-electrolyte material and a battery that includes the solid-electrolyte material.

2. Description of the Related Art

Japanese Unexamined Patent Application Publication No. 2011-129312 discloses a solid-state battery that includes a sulfide solid electrolyte. International Publication No. 2018/025582 discloses a solid-electrolyte material represented by $Li_{6-3z}Y_zX_6$ (where $0<z<2$ is satisfied and X represents Cl or Br).

SUMMARY

One non-limiting and exemplary embodiment provides a solid-electrolyte material that may have a high lithium-ion conductivity.

In one general aspect, the techniques disclosed here feature a solid-electrolyte material including Li, Y, O, and X. X is at least two elements selected from the group consisting of F, Cl, Br, and I. O is present in a surface region of the solid-electrolyte material.

The present disclosure provides a solid-electrolyte material that may have a high lithium-ion conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
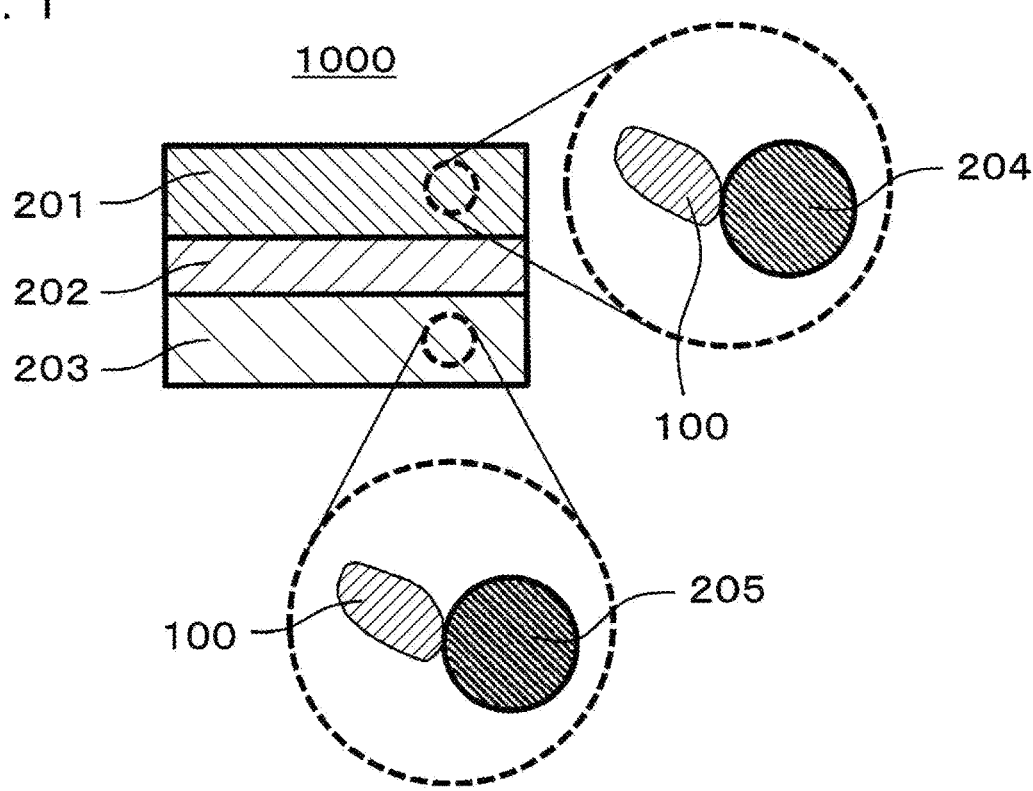
FIG. 1 is a cross-sectional view of a battery according to a second embodiment.

Embodiments of the present disclosure are described with reference to the attached drawings below.

First Embodiment

A solid-electrolyte material according to a first embodiment includes Li, Y, O, and X. X is at least two elements selected from the group consisting of F, Cl, Br, and I. O is present in a surface region of the solid-electrolyte material.

The solid-electrolyte material according to the first embodiment may have a high lithium-ion conductivity.

A solid-state battery having excellent charge-discharge characteristics may be produced using the solid-electrolyte material according to the first embodiment. The solid-state battery may be either a primary battery or a secondary battery.

It is desirable that the solid-electrolyte material according to the first embodiment do not contain sulfur. A sulfur-free solid-electrolyte material does not produce hydrogen sulfide when exposed to air. Accordingly, in the case where the solid-electrolyte material according to the first embodiment does not contain sulfur, a battery including the solid-electrolyte material may be excellent in terms of safety. Note that the sulfide solid electrolyte disclosed in Japanese Unexamined Patent Application Publication No. 2011-129312 may produce hydrogen sulfide when exposed to air.

The solid-electrolyte material according to the first embodiment may further include at least one element selected from the group consisting of Mg, Ca, Zn, Sr, Ba, Al, Sc, Ga, Bi, La, Zr, Hf, Ta, and Nb in order to increase the ionic conductivity of the solid-electrolyte material.

The solid-electrolyte material according to the first embodiment may be composed of Li, Y, O, and X in order to increase the ionic conductivity of the solid-electrolyte material.

In order to increase the ionic conductivity of the solid-electrolyte material, the molar ratio of O to Y in a surface region of the solid-electrolyte material according to the first embodiment may be higher than the molar ratio of O to Y in the entirety of the solid-electrolyte material.

X may be Cl and Br in order to increase the ionic conductivity of the solid-electrolyte material. In such a case, the mole fraction of Cl in X may be higher than the mole fraction of Br in X. This reduces the weight of the solid-electrolyte material according to the first embodiment.

An X-ray diffraction pattern of the solid-electrolyte material according to the first embodiment may be measured using Cu-Kα radiation. In the X-ray diffraction pattern, a peak may be present at a diffraction angle 2θ of greater than or equal to 13.6° and less than or equal to 14.6°, a diffraction angle 2θ of greater than or equal to 27.8° and less than or equal to 29.0°, a diffraction angle 2θ of greater than or equal to 32.0° and less than or equal to 33.3°, a diffraction angle 2θ of greater than or equal to 46.3° and less than or equal to 47.8°, and a diffraction angle 2θ of greater than or equal to 57.2° and less than or equal to 59.8°. In such a case, the solid-electrolyte material may have a high ionic conductivity.

When the molar ratio of Li to Y is defined as x, the molar ratio of Cl to Y is defined as y, and the molar ratio of Br to Y is defined as z, the following three expressions may be satisfied:

$2.6 \leq x \leq 3.4$, $2.7 \leq y \leq 4.2$, and $1.6 \leq z \leq 2.5$,

In such a case, the solid-electrolyte material may have a high ionic conductivity.

Moreover, the following three expressions may be satisfied:

$2.99 \leq x \leq 3.05$, $3.05 \leq y \leq 3.81$, and $1.79 \leq z \leq 2.19$.

In such a case, the solid-electrolyte material may have a further high ionic conductivity.

When the molar ratio of O to Y is defined as "a", $$0 < a \leq 0.68$$

may be satisfied. In such a case, the solid-electrolyte material may have a high ionic conductivity.

Furthermore, $$0 < a \leq 0.11$$

may be satisfied. In such a case, the solid-electrolyte material may have a further high ionic conductivity.

The shape of the solid-electrolyte material according to the first embodiment is not limited. Examples of the above shape include acicular, spherical, and oval. The solid-electrolyte material according to the first embodiment may be particulate. The solid-electrolyte material according to the first embodiment may be formed in a pellet-like or plate-like shape.

For example, in the case where the shape of the solid-electrolyte material according to the first embodiment is particulate (e.g., spherical), the solid-electrolyte material according to the first embodiment may have a median diameter of greater than or equal to 0.1 µm and less than or equal to 100 µm.

The above median diameter may be greater than or equal to 0.5 µm and less than or equal to 10 µm in order to increase the ionic conductivity of the solid-electrolyte material according to the first embodiment and disperse the solid-electrolyte material according to the first embodiment and an active material in a suitable manner. In order to disperse the solid-electrolyte material according to the first embodiment and an active material in a further suitable manner, the solid-electrolyte material according to the first embodiment may have a smaller median diameter than the active material.

Method for Producing Solid Electrolyte Material

The solid-electrolyte material according to the first embodiment may be produced by the following method.

First, powders of halide raw materials are mixed with one another.

For example, in the case where a solid-electrolyte material composed of Li, Y, Cl, Br, and O is synthesized, a $YCl_3$ raw material powder, a LiCl raw material powder, and a LiBr raw material powder are mixed with one another. The resulting mixed powder is heat-treated in an inert gas atmosphere having a predetermined oxygen concentration and a predetermined moisture concentration (e.g., an argon atmosphere having a dew point of less than or equal to −60° C.). The product of the reaction is left to stand in an atmosphere having a relatively high dew point (e.g., an argon atmosphere having a dew point of −30° C.) and subsequently heat-treated at a temperature (e.g., 400° C.) lower than or equal to the melting point. The raw material powders may be mixed with one another at a specific molar ratio that has been determined such that the composition change that may occur in the synthesis process can be canceled out. The oxygen content in the solid-electrolyte material is determined by selecting the raw material powders, the oxygen concentration in the atmosphere, the moisture concentration in the atmosphere, and the amount of time during which the reaction is conducted. The solid-electrolyte material according to the first embodiment is produced in the above-described manner.

The raw material powders mixed with one another may be powders of an oxide and a halide. For example, $Y_2O_3$, $NH_4Cl$, and LiBr may be used as raw material powders.

Various types of halides may be produced by selecting the raw material powders and the mixing ratio between the raw material powders.

Examples of the above halide include $Li_{3.1}Y_{0.9}Ca_{0.1}Br_3Cl_3$, $Li_{2.4}Y_{0.8}Ca_{0.6}Br_2I_2F_2$, $Li_3YBr_5F$, $Li_{2.7}Y_{1.1}Br_3Cl_3$, $Li_{2.7}Y_{1.1}BrCl_5$, $Li_{3.3}Y_{0.9}Br_3Cl_3$, $Li_3YBrCl_5$, $Li_3YBr_4Cl_2$, and $Li_3YBr_{0.5}Cl_{5.5}$.

The above halides have a high ionic conductivity. When the above halides are exposed to the atmosphere having a high dew point, solid-electrolyte materials including O and H are produced. The solid-electrolyte materials produced in the above-described manner may also have a high ionic conductivity.

Second Embodiment

A second embodiment is described below. The items described in the first embodiment are omitted as needed.

A battery according to the second embodiment includes a positive electrode, an electrolyte layer, and a negative electrode. The electrolyte layer is interposed between the positive and negative electrodes. At least one selected from the group consisting of the positive electrode, the electrolyte layer, and the negative electrode includes the solid-electrolyte material according to the first embodiment. Since the battery according to the second embodiment includes the solid-electrolyte material according to the first embodiment, it may have excellent charge-discharge characteristics.

FIG. 1 is a cross-sectional view of a battery 1000 according to the second embodiment.

The battery 1000 includes a positive electrode 201, an electrolyte layer 202, and a negative electrode 203. The positive electrode 201 includes a positive electrode active material particle 204 and a solid electrolyte particle 100. The electrolyte layer 202 is interposed between the positive electrode 201 and the negative electrode 203. The electrolyte layer 202 includes an electrolyte material (e.g., a solid-electrolyte material). The negative electrode 203 includes a negative electrode active material particle 205 and a solid electrolyte particle 100.

The solid electrolyte particle 100 is a particle including the solid-electrolyte material according to the first embodiment as a principal component.

The solid electrolyte particle 100 may be a particle composed of the solid-electrolyte material according to the first embodiment.

The positive electrode 201 includes a material capable of occluding and releasing a metal ion (e.g., a lithium ion). Examples of such a material include a positive electrode active material (e.g., the positive electrode active material particles 204).

Examples of the positive electrode active material include a lithium transition metal oxide, a transition metal fluoride, a polyanion material, a polyanion fluoride material, a transition metal sulfide, a transition metal oxyfluoride, a transition metal oxysulfide, and a transition metal oxynitride. Examples of the lithium transition metal oxide include $LiNi_{1-d-f}Co_dAl_fO_2$ (where 0<d, 0<f, and 0<(d+f)<1) and $LiCoO_2$.

The positive electrode active material particles 204 may have a median diameter of greater than or equal to 0.1 µm in order to disperse the positive electrode active material particles 204 and the solid electrolyte particles 100 in the positive electrode 201 in a suitable manner. Dispersing the positive electrode active material particles 204 and the solid electrolyte particles 100 in the positive electrode 201 in a suitable manner enhances the charge-discharge characteristics of the battery 1000. The positive electrode active material particles 204 may have a median diameter of less than or equal to 100 µm in order to cause lithium to quickly diffuse inside the positive electrode active material particles 204. The quick diffusion of lithium enables the battery 1000 to be operated at a high power. As described above, the positive electrode active material particles 204 may have a median diameter of greater than or equal to 0.1 µm and less than or equal to 100 µm.

The positive electrode active material particles 204 may have a larger median diameter than the solid electrolyte particles 100 in order to disperse the positive electrode active material particles 204 and the solid electrolyte particles 100 in the positive electrode 201 in a suitable manner.

In order to increase the energy density and power of the battery 1000, in the positive electrode 201, the ratio of the volume of the positive electrode active material particles 204 to the total volume of the positive electrode active material particles 204 and the solid electrolyte particles 100 may be greater than or equal to 0.30 and less than or equal to 0.95.

In order to increase the energy density and power of the battery 1000, the positive electrode 201 may have a thickness of greater than or equal to 10 µm and less than or equal to 500 µm.

The electrolyte layer 202 includes an electrolyte material. The electrolyte material may be the solid-electrolyte material according to the first embodiment. The electrolyte layer 202 may be a solid-electrolyte layer.

The electrolyte layer 202 may be composed only of the solid-electrolyte material according to the first embodiment. Alternatively, the electrolyte layer 202 may be composed only of a solid-electrolyte material different from the solid-electrolyte material according to the first embodiment.

Examples of the solid-electrolyte material different from the solid-electrolyte material according to the first embodiment include $Li_2MgX'_4$, $Li_2FeX'_4$, $Li(Al,Ga,In)X'_4$, $Li_3(Al,Ga,In)X'_6$, and LiI, where X' is at least one element selected from the group consisting of F, Cl, Br, and I.

Hereinafter, the solid-electrolyte material according to the first embodiment is referred to as "first solid-electrolyte material", and the solid-electrolyte material different from the solid-electrolyte material according to the first embodiment is referred to as "second solid-electrolyte material".

The electrolyte layer 202 may include the second solid-electrolyte material in addition to the first solid-electrolyte material. The first and second solid-electrolyte materials may be dispersed uniformly. A layer composed of the first solid-electrolyte material and a layer composed of the second solid-electrolyte material may be stacked on top of each other in the direction in which the layers constituting the battery 1000 are stacked.

The electrolyte layer 202 may have a thickness of greater than or equal to 1 µm and less than or equal to 100 µm in order to reduce the risk of short circuit between the positive electrode 201 and the negative electrode 203 and increase the power of the battery.

The negative electrode 203 includes a material capable of occluding and releasing a metal ion (e.g., a lithium ion). Examples of such a material include a negative electrode active material (e.g., the negative electrode active material particles 205).

Examples of the negative electrode active material include a metal material, a carbon material, an oxide, a nitride, a tin compound, and a silicon compound. The metal material may be a simple substance or an alloy. Examples of the metal material include lithium metal or a lithium alloy. Examples of the carbon material include natural graphite, coke, graphitizing carbon, carbon fibers, spherical carbon, artificial graphite, and amorphous carbon. Examples of negative electrode active materials suitable in terms of capacity density include silicon (i.e., Si), tin (i.e., Sn), a silicon compound, and a tin compound.

The negative electrode active material particles 205 may have a median diameter of greater than or equal to 0.1 µm in order to disperse the negative electrode active material particles 205 and the solid electrolyte particles 100 in the negative electrode 203 in a suitable manner. Dispersing the negative electrode active material particles 205 and the solid electrolyte particles 100 in the negative electrode 203 in a suitable manner enhances the charge-discharge characteristics of the battery. The negative electrode active material particles 205 may have a median diameter of less than or equal to 100 µm in order to cause lithium to quickly diffuse inside the negative electrode active material particles 205. The quick diffusion of lithium enables the battery to be operated at a high power. As described above, the negative electrode active material particles 205 may have a median diameter of greater than or equal to 0.1 µm and less than or equal to 100 µm.

The negative electrode active material particles 205 may have a larger median diameter than the solid electrolyte particles 100 in order to disperse the negative electrode active material particles 205 and the solid electrolyte particles 100 in the negative electrode 203 in a suitable manner.

In order to increase the energy density and power of the battery 1000, in the negative electrode 203, the ratio of the volume of the negative electrode active material particles 205 to the total volume of the negative electrode active material particles 205 and the solid electrolyte particles 100 may be greater than or equal to 0.30 and less than or equal to 0.95.

In order to increase the energy density and power of the battery 1000, the negative electrode 203 may have a thickness of greater than or equal to 10 µm and less than or equal to 500 µm.

At least one selected from the group consisting of the positive electrode 201, the electrolyte layer 202, and the negative electrode 203 may include the second solid-electrolyte material in order to enhance ionic conductivity, chemical stability, and electrochemical stability.

As described above, the second solid-electrolyte material may be a halide solid electrolyte. Examples of the halide solid electrolyte include $Li_2MgX'_4$, $Li_2FeX'_4$, $Li(Al,Ga,In)X'_4$, $Li_3(Al,Ga,In)X'_6$, and LiI, where X' is at least one element selected from the group consisting of F, Cl, Br, and I.

The second solid-electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid-electrolyte material may be an oxide solid electrolyte.

Examples of the oxide solid electrolyte include:
(i) NASICON-type solid electrolytes, such as $LiTi_2(PO_4)_3$ and element substitution products thereof;
(ii) perovskite-type solid electrolytes, such as $(LaLi)TiO_3$;
(iii) LISICON-type solid electrolytes, such as $Li_{14}ZnGe_4O_{16}$, $Li_4SiO_4$, $LiGeO_4$, and element substitution products thereof;
(iv) garnet-type solid electrolytes, such as $Li_7La_3Zr_2O_{12}$ and element substitution products thereof; and
(v) $Li_3PO_4$ and N-substitution products thereof.

The second solid-electrolyte material may be an organic polymer solid electrolyte.

Examples of the organic polymer solid electrolyte include a high-molecular-weight compound and a compound of a lithium salt. The high-molecular-weight compound may have an ethylene oxide structure. Since a high-molecular-weight compound having an ethylene oxide structure is capable of containing a large amount of lithium salt, ionic conductivity can be further increased.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. Only one type of lithium salt selected from the above lithium salts may be used alone. Two or more types of lithium salts selected from the above lithium salts may be used in a mixture.

At least one selected from the group consisting of the positive electrode 201, the electrolyte layer 202, and the negative electrode 203 may include a nonaqueous electrolyte solution, a gel electrolyte, or an ionic liquid in order to facilitate the transfer of lithium ions and enhance the output characteristics of the battery 1000.

The nonaqueous electrolyte solution includes a nonaqueous solvent and a lithium salt dissolved in the nonaqueous solvent.

Examples of the nonaqueous solvent include a cyclic carbonate ester solvent, a chain carbonate ester solvent, a cyclic ether solvent, a chain ether solvent, a cyclic ester solvent, a chain ester solvent, and a fluorine solvent.

Examples of the cyclic carbonate ester solvent include ethylene carbonate, propylene carbonate, and butylene carbonate.

Examples of the chain carbonate ester solvent include dimethyl carbonate, ethylmethyl carbonate, and diethyl carbonate.

Examples of the cyclic ether solvent include tetrahydrofuran, 1,4-dioxane, and 1,3-dioxolane.

Examples of the chain ether solvent include 1,2-dimethoxyethane and 1,2-diethoxyethane.

Examples of the cyclic ester solvent include γ-butyrolactone.

Examples of the chain ester solvent include methyl acetate.

Examples of the fluorine solvent include fluoroethylene carbonate, methyl fluoropropionate, fluorobenzene, fluoroethyl methyl carbonate, and fluorodimethylene carbonate.

Only one type of nonaqueous solvent selected from the above nonaqueous solvents may be used alone. Two or more types of nonaqueous solvents selected from the above nonaqueous solvents may be used in a mixture.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. Only one type of lithium salt selected from the above lithium salts may be used alone. Two or more types of lithium salts selected from the above lithium salts may be used in a mixture.

The concentration of the lithium salt is, for example, greater than or equal to 0.5 mol/liter and less than or equal to 2 mol/liter.

The gel electrolyte may be a polymer material impregnated with a nonaqueous electrolyte solution. Examples of the polymer material include polyethylene oxide, polyacrylonitrile, polyvinylidene fluoride, polymethyl methacrylate, and a polymer including an ethylene oxide bond.

Examples of the cation included in the ionic liquid include:

(i) aliphatic chain quaternary salts, such as tetraalkylammonium and tetraalkylphosphonium;

(ii) aliphatic cyclic ammoniums, such as a pyrrolidinium, a morpholinium, an imidazolinium, a tetrahydropyrimidinium, a piperazinium, and a piperidinium; and (iii) nitrogen-containing heterocyclic aromatic cations, such as a pyridinium and an imidazolium.

Examples of the anion included in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may include a lithium salt.

At least one selected from the group consisting of the positive electrode 201, the electrolyte layer 202, and the negative electrode 203 may include a binding agent in order to increase the adhesion between the particles.

Examples of the binding agent include polyvinylidene fluoride, polytetrafluoroethylene, polyethylene, polypropylene, an aramid resin, polyamide, polyimide, polyamide imide, polyacrylonitrile, polyacrylic acid, polymethyl acrylate ester, polyethyl acrylate ester, polyhexyl acrylate ester, polymethacrylic acid, polymethyl methacrylate ester, polyethyl methacrylate ester, polyhexyl methacrylate ester, polyvinyl acetate, polyvinylpyrrolidone, polyether, polyethersulfone, hexafluoropolypropylene, a styrene-butadiene rubber, and carboxymethyl cellulose.

A copolymer may also be used as a binding agent. Examples of such a binding agent include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. Alternatively, a mixture of two or more materials selected from the above materials may be used as a binding agent.

At least one selected from the positive electrode 201 and the negative electrode 203 may include a conductant agent in order to increase electron conductivity.

Examples of the conductant agent include:

(i) graphite materials, such as natural graphite and artificial graphite;

(ii) carbon black materials, such as acetylene black and Ketjenblack;

(iii) conductive fibers, such as a carbon fiber and a metal fiber;

(iv) carbon fluorides;

(v) metal powders, such as aluminum;

(vi) conductive whiskers, such as zinc oxide and potassium titanate;

(vii) conductive metal oxides, such as titanium oxide; and (viii) conductive high-molecular-weight compounds, such as polyaniline, polypyrrole, and polythiophene.

The conductant agents (i) and (ii) may be used to reduce the costs.

Examples of the shape of the battery according to the second embodiment include coin-like, cylindrical, rectangular, sheet-like, button-like, flat, and multilayer.

EXAMPLES

The present disclosure is described in further detail with reference to Examples below.

Example 1

Preparation of Solid-Electrolyte Material $YCl_3$, LiCl, and LiBr were prepared as raw material powders at a $YCl_3$:LiCl:LiBr molar ratio of about 1:1:2 in an argon atmosphere having a dew point of less than or equal to −60° C. (hereinafter, referred to as "dry argon atmosphere"). These powders were pulverized and mixed with one another in a mortar. The resulting mixture was heat-treated at 500° C. for 1 hour in an alumina crucible and then pulverized in a mortar. The reaction product was left to stand in an atmosphere having a dew point of −30° C. for about 3 minutes, subsequently heat-treated in the dry argon atmosphere at 400° C. for 1 hour, and then pulverized in a mortar. A solid-electrolyte material of Example 1 was prepared in the above-described manner.

Analysis of Composition of Solid-Electrolyte Material

The contents of Li and Y per unit weight of the solid-electrolyte material prepared in Example 1 were measured using a high-frequency inductively coupled plasma atomic emission spectrometer (iCAP7400 produced by Thermo Fisher Scientific) by high-frequency inductively coupled plasma atomic emission spectroscopy. The contents of Cl and Br in the solid-electrolyte material prepared in Example 1 were measured using an ion chromatography system (ICS-2000 produced by Dionex) by ion chromatography. The molar ratio of Li:Y:Cl:Br was calculated on the basis of the contents of Li, Y, Cl, and Br obtained from the results of the above measurement. As a result, it was confirmed that the solid-electrolyte material prepared in Example 1 had a Li:Y:Cl:Br molar ratio of 3.02:1.0:3.81:2.19.

The proportion of the mass of O to the total mass of the solid-electrolyte material prepared in Example 1 was measured with an oxygen, nitrogen, and hydrogen analyzer (EMGA-930 produced by HORIBA, Ltd.) by a non-dispersive infrared absorption method. The measurement results confirmed that the above proportion was 0.26%. The molar ratio of Y:O was calculated on the basis of the above proportion. As a result, it was confirmed that the solid-electrolyte material prepared in Example 1 had a Y:O molar ratio of 1.00:0.07.

The molar ratio of O to Y in a surface region of the solid-electrolyte material prepared in Example 1 was measured by X-ray photoelectron spectroscopy using a scanning X-ray photoelectron spectroscopy system (PHI Quantera SXM produced by ULVAC-PHI, Inc.). Al radiation was used as an X-ray source. The results of the above measurement confirmed that the molar ratio Y:O in a surface region of the solid-electrolyte material prepared in Example 1 was 1.00:0.44. The term "surface region" used herein refers to the region measured in the above-described manner. Specifically, the surface region of the solid-electrolyte material according to the first embodiment extended about 5 nm inward from the surface of the solid-electrolyte material.

In this composition analysis, an element the mole fraction of which to Y was less than or equal to 0.001% was considered an impurity.

X-Ray Diffraction

An X-ray diffraction pattern of the solid-electrolyte material prepared in Example 1 was measured with an X-ray diffractometer (Rigaku Corporation, MiniFlex 600) in a dry environment having a dew point of less than or equal to −45° C. The X-ray source used was Cu-Kα radiation (wavelengths: 1.5405 and 1.5444 Å).

Figure 2:
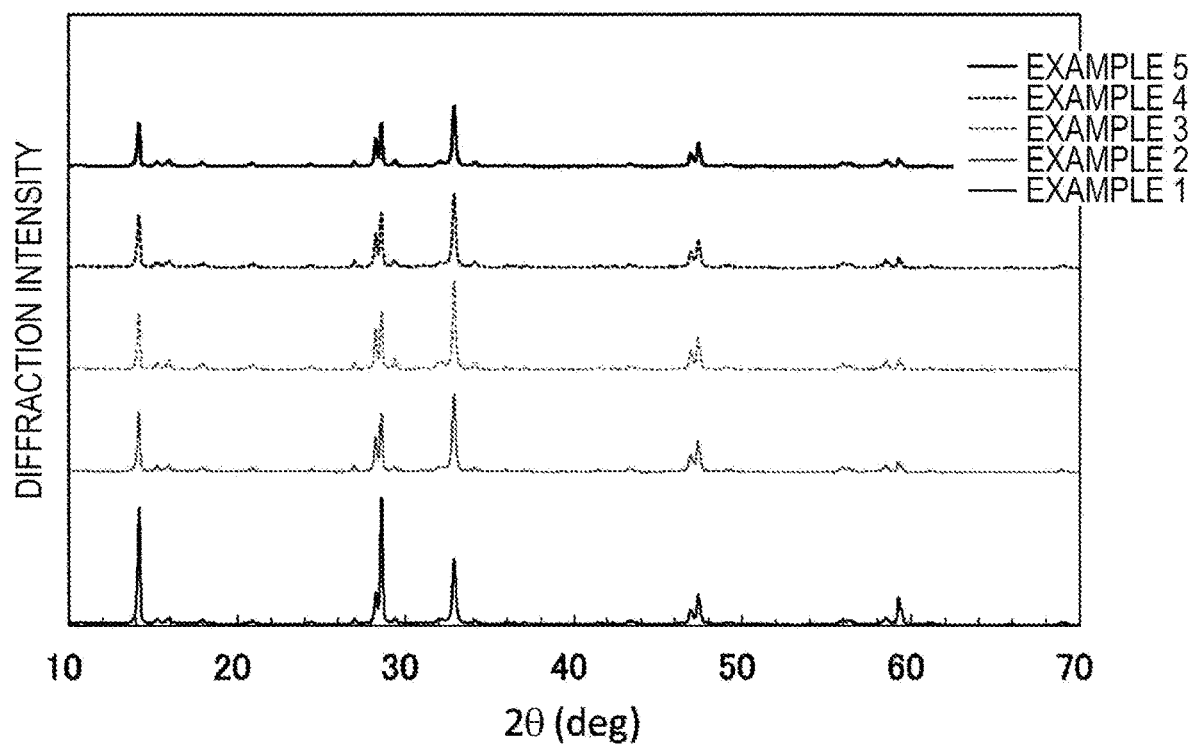
FIG. 2 includes graphs illustrating the X-ray diffraction patterns of solid-electrolyte materials prepared in Examples 1 to 5.

The results of the X-ray diffraction measurement confirmed that a peak was present at 14.17°, 28.27°, 28.62°, 32.87°, 47.40°, and 59.25°. FIG. 2 includes a graph illustrating the X-ray diffraction pattern of the solid-electrolyte material prepared in Example 1.

Evaluation of Ionic Conductivity

Figure 3:
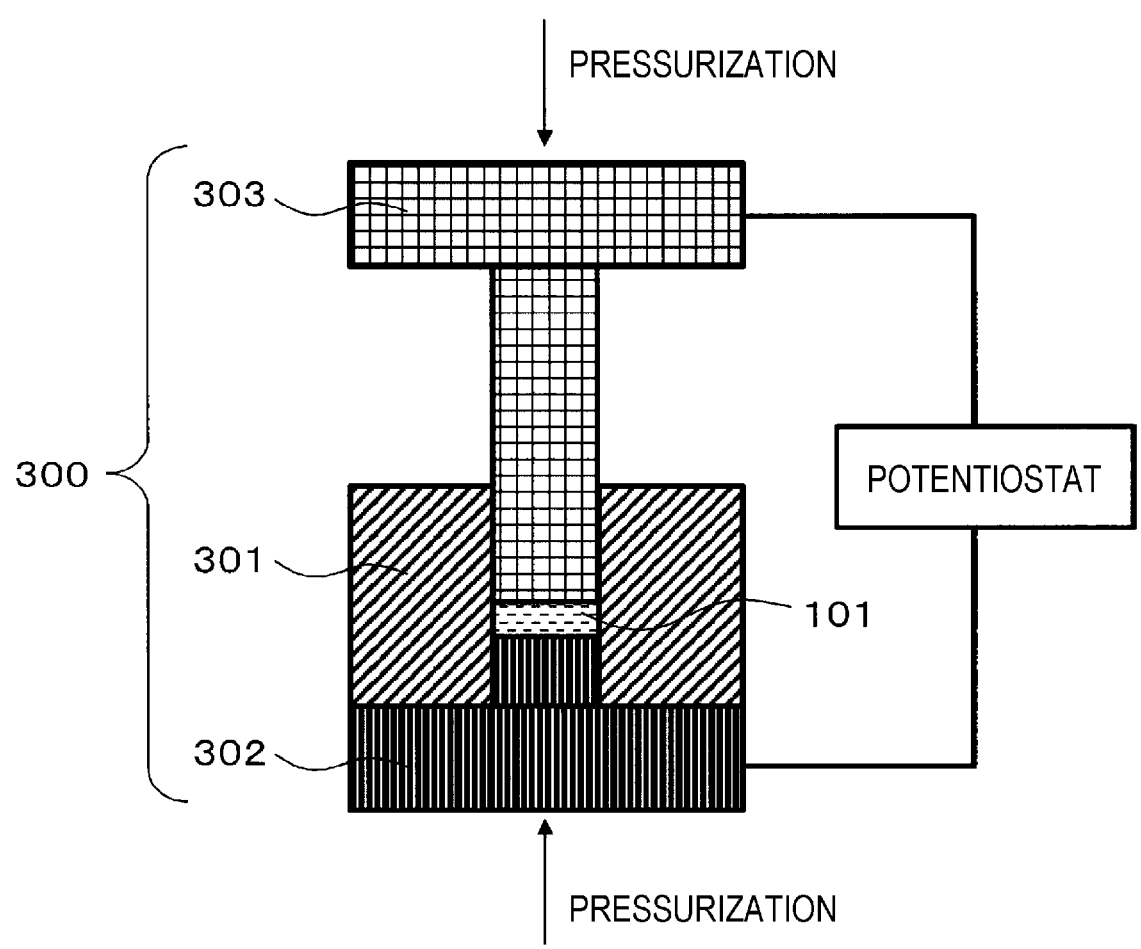
FIG. 3 is a schematic diagram illustrating a pressure molding die used for evaluating the ionic conductivity of a solid-electrolyte material.

FIG. 3 is a schematic diagram illustrating a pressure molding die 300 used for evaluating the ionic conductivity of the solid-electrolyte material. The pressure molding die 300 included a die 301, a punch lower portion 302, and a punch upper portion 303. The die 301 was composed of insulated polycarbonate. The punch upper and lower portions 303 and 302 were both composed of electronically conductive stainless steel.

The ionic conductivity of the solid-electrolyte material prepared in Example 1 was measured using the pressure molding die 300 illustrated in FIG. 3 by the following method.

In a dry argon atmosphere, a powder of the solid-electrolyte material prepared in Example 1 was charged into the pressure molding die 300. Inside the pressure molding die 300, a pressure of 400 MPa was applied to the solid-electrolyte material prepared in Example 1 using the punch lower and upper portions 302 and 303.

While the pressure was applied to the solid-electrolyte material, the impedance of the solid-electrolyte material prepared in Example 1 was measured using a potentiostat (Princeton Applied Research, VersaSTAT4) via the punch upper and lower portions 303 and 302 by an electrochemical impedance measurement method at room temperature. The punch upper portion 303 was connected to the working electrode and a potential-measuring terminal. The punch lower portion 302 was connected to the counter electrode and the reference electrode.

Figure 4:
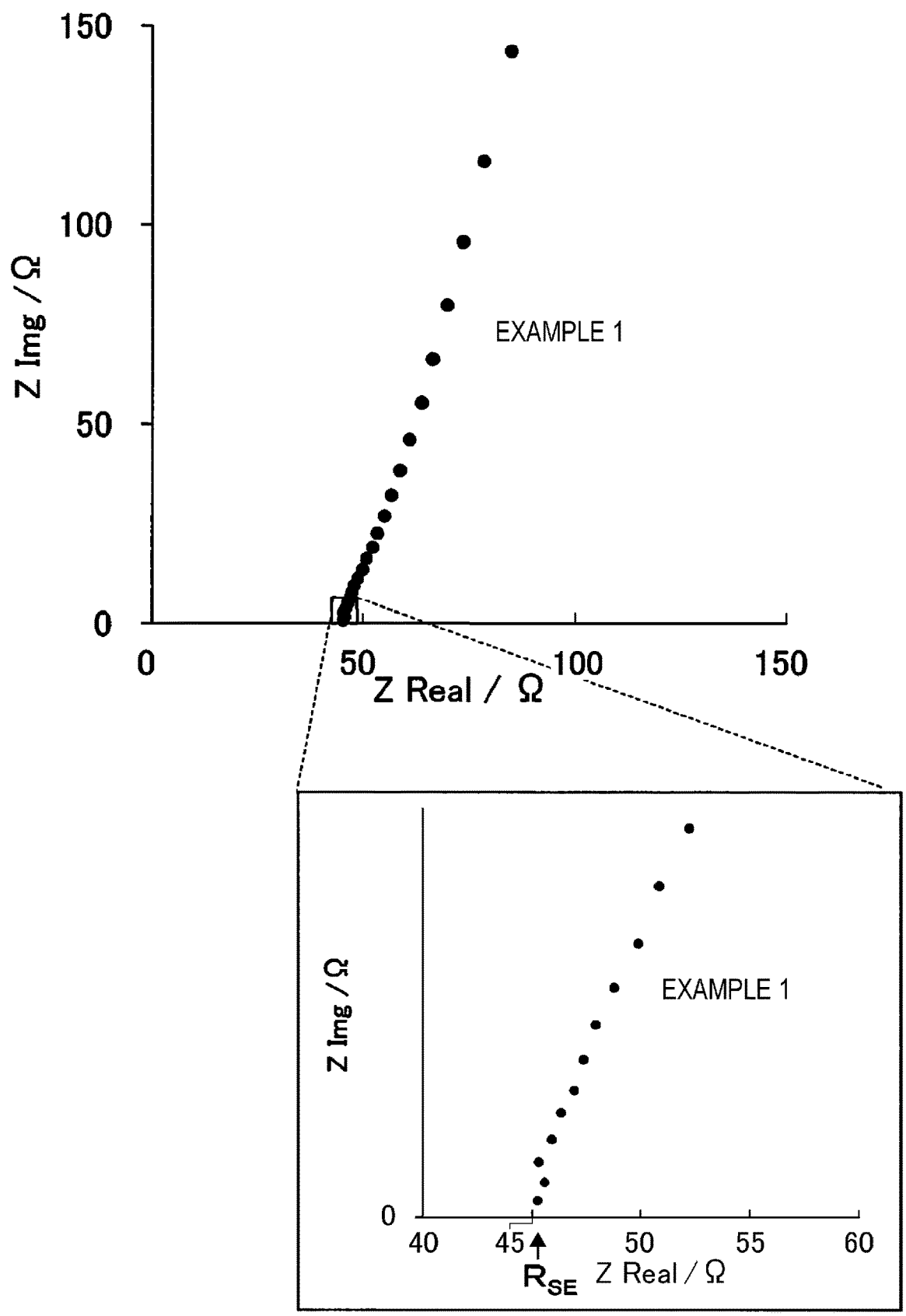
FIG. 4 is a graph illustrating the Cole-Cole plot of the results of measurement of the impedance of a solid-electrolyte material prepared in Example 1.
Figure 5:
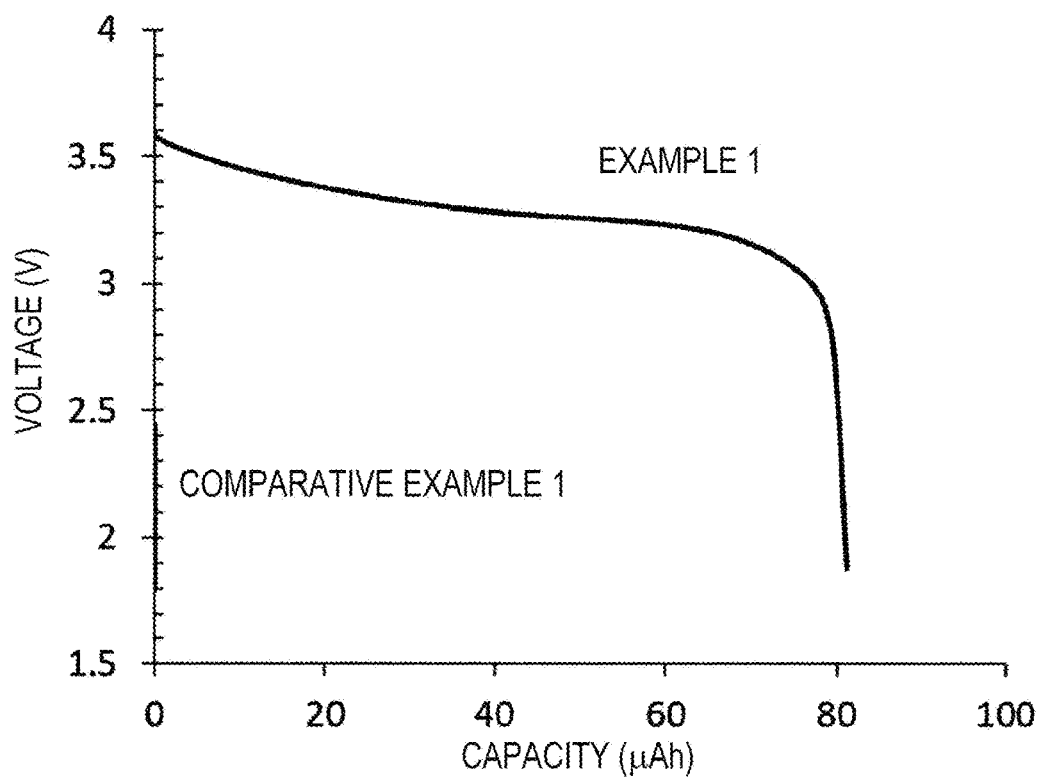
FIG. 5 includes graphs illustrating the initial discharge characteristics of batteries prepared in Example 1 and Comparative example 1.

FIG. 4 is a graph illustrating the Cole-Cole plot of the results of the impedance measurement.

In FIG. 4, the real part of the impedance at the measurement point at which the absolute value of phase of complex impedance was minimum was considered the resistance of the solid-electrolyte material prepared in Example 1 to ionic conduction. For the above real part, refer to the arrow $R_{SE}$ illustrated in FIG. 4. Ionic conductivity was calculated from the above resistance using Expression (2) below.

$$\sigma = (R_{SE} \times S/t)^{-1} \qquad (2)$$

where σ represents ionic conductivity, S represents the area of a part of the solid-electrolyte material which comes into contact with the punch upper portion 303 (equal to the cross-sectional area of the hollowed part of the die 301 in FIG. 3), $R_{SE}$ represents the resistance of the solid-electrolyte material measured in the above impedance measurement, and t represents the thickness of the solid-electrolyte material to which the pressure has been applied (equal to the thickness of the layer formed of the solid-electrolyte material powder 101 in FIG. 3).

The ionic conductivity of the solid-electrolyte material prepared in Example 1 which was measured at 25° C. was $1.4 \times 10^4$ S/cm.

Preparation of Battery

In a dry low-argon atmosphere, the solid-electrolyte material prepared in Example 1 and $LiCoO_2$, which served as an active material, were prepared at a volume ratio of 70:30. The above materials were mixed with each other in an agate mortar to form an electrode mixture.

In an insulated cylinder having an inside diameter of 9.5 mm, the solid-electrolyte material (156 mg) prepared in Example 1, the above electrode mixture (10.0 mg), and an aluminum powder (14.7 mg) were stacked on top of one another. A pressure of 300 MPa was applied to the resulting multilayer body. Hereby, a first electrode and a solid-electrolyte layer were formed. The solid-electrolyte layer had a thickness of 700 μm.

Subsequently, a metal In foil was stacked on the solid-electrolyte layer. The solid-electrolyte layer was interposed between the metal In foil and the first electrode. The metal In foil had a thickness of 200 μm. Then, a pressure of 80 MPa was applied to the metal In foil. Hereby, a second electrode was formed.

A current collector formed of stainless steel was attached to the first and second electrodes. Current collection leads were then attached to the respective current collectors. Finally, the inside of the insulated cylinder was isolated from the outside atmosphere using an insulated ferrule. Thus, the inside of the cylinder was hermetically sealed. A battery of Example 1 was prepared in the above-described manner.

Charge-Discharge Test

The battery prepared in Example 1 was placed in a thermostat maintained at 25° C.

The battery prepared in Example 1 was charged to a voltage of 3.7 V at a current corresponding to 0.05 C rate (20-hour rate) with respect to the theoretical capacity of the battery.

Subsequently, the battery prepared in Example 1 was discharged to a voltage of 1.9 V at the current corresponding to 0.05 C rate.

The results of the charge-discharge test confirmed that the battery prepared in Example 1 had an initial discharge capacity of 81 μAh.

Examples 2 to 5

Preparation of Solid-Electrolyte Material

Example 2

A solid-electrolyte material of Example 2 was prepared as in Example 1, except that the amount of time during which the reaction product was left to stand in the atmosphere having a dew point of −30° C. was changed from about 3 minutes to 1 hour.

Example 3

A solid-electrolyte material of Example 3 was prepared as in Example 1, except that the amount of time during which the reaction product was left to stand in the atmosphere having a dew point of −30° C. was changed from about 3 minutes to 2 hours.

Example 4

A solid-electrolyte material of Example 4 was prepared as in Example 1, except that the amount of time during which the reaction product was left to stand in the atmosphere having a dew point of −30° C. was changed from about 3 minutes to 12 hours.

Example 5

A solid-electrolyte material of Example 5 was prepared as in Example 1, except that the amount of time during which the reaction product was left to stand in the atmosphere having a dew point of −30° C. was changed from about 3 minutes to 24 hours.

Analysis of Composition of Solid-Electrolyte Material

The compositions of the solid-electrolyte materials prepared in Examples 2 to 5 were analyzed as in Example 1. The proportions of the mass of O to the total mass of the solid-electrolyte material in Examples 2, 3, 4, and 5 were 0.29%, 0.41%, 1.96%, and 2.63%, respectively. Table 1 lists the element ratios.

X-Ray Diffraction

The X-ray diffraction patterns of the solid-electrolyte materials prepared in Examples 2 to 5 were measured as in Example 1.

In the X-ray diffraction pattern of the solid-electrolyte material prepared in Example 2, a peak was present at 14.16°, 28.26°, 28.60°, 32.86°, 47.39°, and 59.22°.

In the X-ray diffraction pattern of the solid-electrolyte material prepared in Example 3, a peak was present at 14.16°, 28.27°, 28.61°, 32.87°, 47.39°, and 59.28°.

In the X-ray diffraction pattern of the solid-electrolyte material prepared in Example 4, a peak was present at 14.15°, 28.26°, 28.60°, 32.86°, 47.38°, and 59.24°.

In the X-ray diffraction pattern of the solid-electrolyte material prepared in Example 5, a peak was present at 14.16°, 28.27°, 28.60°, 32.87°, 47.39°, and 59.24°.

Thus, the solid-electrolyte materials prepared in Examples 2 to 5 had peaks at substantially the same diffraction angles as in Example 1. FIG. 2 illustrates the X-ray diffraction patterns.

Evaluation of Ionic Conductivity

The ionic conductivity values of the solid-electrolyte materials prepared in Examples 2 to 5 were measured as in Example 1. Table 1 lists the ionic conductivity values measured.

Preparation of Battery

Batteries of Examples 2 to 5 were prepared as in Example 1 using a corresponding one of the solid-electrolyte materials prepared in Examples 2 to 5.

Charge-Discharge Test

A charge-discharge test was conducted as in Example 1 using a corresponding one of the batteries prepared in Examples 2 to 5.

The batteries prepared in Examples 2 to 5 were charged and discharged in a suitable manner, similarly to the battery prepared in Example 1.

Comparative Example 1

LiCl and $FeCl_2$ were prepared as raw material powders at a $LiCl:FeCl_2$ molar ratio of 2:1 in a dry argon atmosphere. The above powders were subjected to a milling treatment using a planetary ball mill for 25 hours at 600 rpm so as to react with each other mechanochemically. A solid-electrolyte material of Comparative example 1 was prepared in the above-described manner. The solid-electrolyte material prepared in Comparative example 1 had a composition represented by $Li_2FeCl_4$.

The ionic conductivity of the solid-electrolyte material prepared in Comparative example 1 was measured as in Example 1. The ionic conductivity measured at 22° C. was $9 \times 10^{-6}$ S/cm.

A battery of Comparative example 1 was prepared as in Example 1. A charge-discharge test was conducted using this battery. The battery prepared in Comparative example 1 had an initial discharge capacity of less than or equal to 1 μAh. That is, the battery prepared in Comparative example 1 was not charged or discharged.

Reference Example 1

$YCl_3$, LiCl, and LiBr were prepared as raw material powders at a $YCl_3:LiCl:LiBr$ molar ratio of about 1:1:2 in a dry argon atmosphere. These powders were pulverized and mixed with one another in a mortar. The resulting mixture was heat-treated at 500° C. for 1 hour in an alumina crucible and then pulverized in a mortar. The product of the reaction was left to stand in an argon atmosphere having a dew point of −30° C. for 2 hours. A solid-electrolyte material of Reference example 1 was prepared in the above-described manner.

The oxygen content in the entire solid-electrolyte material prepared in Reference example 1 and the ionic conductivity of the solid-electrolyte material were measured as in Example 1. Table 1 lists the measurement results.

Infrared Spectroscopic Analysis

Figure 6:
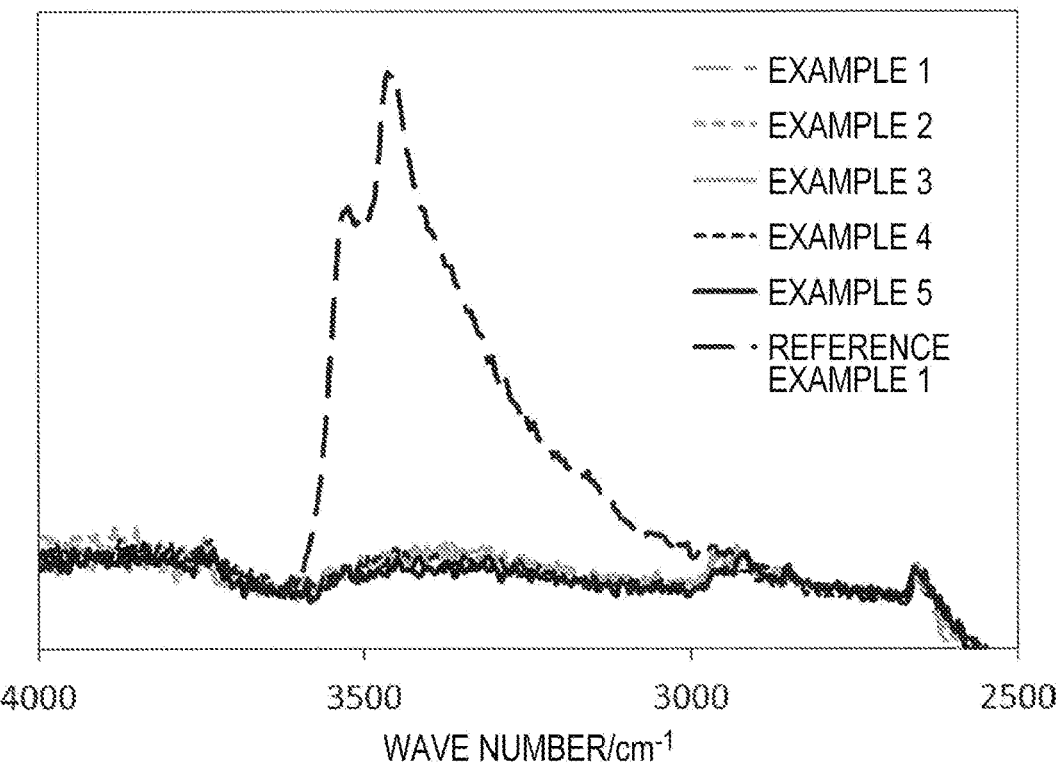
FIG. 6 includes graphs illustrating infrared absorption spectra of solid-electrolyte materials prepared in Examples 1 to 5 and Reference example 1.

The solid-electrolyte materials prepared in Examples 1 to 5 and Reference example 1 were analyzed by an attenuated total reflection method using an infrared spectrometer ("ALPHA" produced by Bruker). The prism was made of diamond. The results of the analysis confirmed that the solid-electrolyte material prepared in Reference example 1 had a peak in a region of 3100 $cm^{-1}$ to 3640 $cm^{-1}$, the peak indicating the presence of a bond between a proton (H*) and an oxygen atom. On the other hand, the solid-electrolyte materials prepared in Examples 1 to 5 did not have the peak. In the infrared spectroscopic analysis, a portion of each solid-electrolyte material which extended about 1 μm inward from the surface was measured. FIG. 6 illustrates the infrared spectroscopy spectra.

TABLE 1

| | Element ratio | | | | Molar ratio O/Y in surface region | Ionic conductivity (S/cm) |
|---|---|---|---|---|---|---|
| | Li | Y | Cl | Br | O | | |
| Example 1 | 3.02 | 1.00 | 3.81 | 2.19 | 0.07 | 0.44 | $1.4 \times 10^{-3}$ |
| Example 2 | 3.04 | 1.00 | 3.73 | 2.15 | 0.07 | 0.49 | $1.3 \times 10^{-3}$ |
| Example 3 | 3.05 | 1.00 | 3.63 | 2.13 | 0.11 | 0.59 | $1.0 \times 10^{-3}$ |
| Example 4 | 2.99 | 1.00 | 3.27 | 1.79 | 0.51 | 1.34 | $1.3 \times 10^{-4}$ |
| Example 5 | 2.99 | 1.00 | 3.05 | 1.81 | 0.68 | 1.51 | $1.7 \times 10^{-5}$ |
| Comparative example 1 | $Li_2FeCl_4$ | | | | | — | $9 \times 10^{-6}$ |
| Reference example 1 | 3.05 | 1.00 | 3.63 | 2.13 | 0.42 | — | $3.8 \times 10^{-4}$ |

Discussions

As is clear from the results listed in Table 1, the solid-electrolyte materials prepared in Examples 1 to 5 had a high ionic conductivity of greater than or equal to $1\times10^{-5}$ S/cm at or near room temperature.

As is clear from a comparison between Examples 1 to 4 and Example 5, when 0<a≤0.51 was satisfied, the solid-electrolyte material had a further high ionic conductivity. As is clear from a comparison between Examples 1 to 3 and Examples 4 and 5, when 0<a≤0.11 was satisfied, the solid-electrolyte material had a further high ionic conductivity.

The molar ratio of O to Y in the surface region of each of the solid-electrolyte materials prepared in Examples 1 to 5 was greater than or equal to double the molar ratio of O to Y in the entirety of the solid-electrolyte material.

As is clear from the results illustrated in FIG. 6, the solid-electrolyte material prepared in Reference example 1 had an oxygen atom bonded to a proton, while the solid-electrolyte materials prepared in Examples 1 to 5 did not have an oxygen atom bonded to a proton. Thus, it is considered that the protons introduced in the production process was desorbed in the second heat-treatment performed in the preparation of the solid-electrolyte materials of Examples 1 to 5.

In the composition analysis of a solid-electrolyte material, measurement error may occur even when the same sample is measured repeatedly. The possible maximum measurement error is about 20%.

The batteries prepared in Examples 1 to 5 were charged and discharged at room temperature, while the battery prepared in Comparative example 1 was not charged or discharged.

Since the solid-electrolyte materials prepared in Examples 1 to 5 do not contain sulfur, they do not produce hydrogen sulfide.

As described above, the solid-electrolyte material according to the present disclosure may have a high lithium-ion conductivity and is appropriate for producing batteries capable of being charged and discharged in a suitable manner.

The battery according to the present disclosure may be used for producing solid-state lithium-ion secondary batteries and the like.

What is claimed is:

1. A solid-electrolyte material consisting of:
Li, Y, O, and X,
and, optionally, at least one element selected from the group consisting of Mg, Ca, Zn, Sr, Ba, Al, Sc, Ga, Bi, La, Zr, Hf, Ta, and Nb,
wherein X is at least two elements selected from the group consisting of F, Cl, Br, and I;
wherein O is present in a surface region of the solid-electrolyte material; and
wherein a peak is present at a diffraction angle 2θ of greater than or equal to 13.6° and less than or equal to 14.6°, a diffraction angle 2θ of greater than or equal to 27.8° and less than or equal to 29.0°, a diffraction angle 2θ of greater than or equal to 32.0° and less than or equal to 33.3°, a diffraction angle 2θ of greater than or equal to 46.3° and less than or equal to 47.8°, and a diffraction angle 2θ of greater than or equal to 57.2° and less than or equal to 59.8° in an X-ray diffraction pattern obtained by an X-ray diffraction measurement using Cu-Kα radiation.

2. The solid-electrolyte material according to claim 1, wherein
the at least one element selected from the group consisting of Mg, Ca, Zn, Sr, Ba, Al, Sc, Ga, Bi, La, Zr, Hf, Ta, and Nb is present in the solid-electrolyte material.

3. The solid-electrolyte material according to claim 1, wherein a molar ratio of O to Y in the surface region of the solid-electrolyte material is higher than a molar ratio of O to Y in the entirety of the solid-electrolyte material.

4. The solid-electrolyte material according to claim 1, wherein X is Cl and Br.

5. The solid-electrolyte material according to claim 4, wherein a mole fraction of Cl in X is higher than a mole fraction of Br in X.

6. The solid-electrolyte material according to claim 4, wherein three expressions below are satisfied:

2.6≤x≤3.4, 2.7≤y≤4.2, and 1.6≤z≤2.5, where
x represents a molar ratio of Li to Y,
y represents a molar ratio of Cl to Y, and
z represents a molar ratio of Br to Y.

7. The solid-electrolyte material according to claim 6, wherein three expressions below are satisfied:

$2.99 \leq x \leq 3.05$, $3.05 \leq y \leq 3.81$, and $1.79 \leq z \leq 2.19$.

8. The solid-electrolyte material according to claim 1, wherein an expression: $0 < a \leq 0.68$ is satisfied, where a represents a molar ratio of O to Y.

9. The solid-electrolyte material according to claim 8, wherein an expression: $0 < a \leq 0.11$ is satisfied.

10. A battery comprising:
a positive electrode;
a negative electrode; and
an electrolyte layer interposed between the positive electrode and the negative electrode,
wherein at least one selected from the group consisting of the positive electrode, the negative electrode, and the electrolyte layer includes the solid-electrolyte material according to claim 1.

* * * * *